No. 799,159. PATENTED SEPT. 12, 1905.
J. R. HAGGARTY.
DATE CALENDAR.
APPLICATION FILED JUNE 23, 1904

6 SHEETS—SHEET 1.

Witnesses
John H. Walker
Thomas Nugent

Inventor
John Rouse Haggarty
per Chas Coventry
Attorney.

No. 799,159. PATENTED SEPT. 12, 1905.
J. R. HAGGARTY.
DATE CALENDAR.
APPLICATION FILED JUNE 23, 1904.

6 SHEETS—SHEET 6.

UNITED STATES PATENT OFFICE.

JOHN ROWSE HAGGARTY, OF OSWESTRY, ENGLAND.

DATE-CALENDAR.

No. 799,159. Specification of Letters Patent. Patented Sept. 12, 1905.

Application filed June 23, 1904. Serial No. 213,844.

*To all whom it may concern:*

Be it known that I, JOHN ROWSE HAGGARTY, a subject of the King of Great Britain and Ireland, residing at Academy Studio, Oswestry, in the county of Shropshire, England, have invented a new and useful Improvement in Date-Calendars, of which the following is a specification.

My invention relates to date-calendars, and has for its object a calendar which is adjustable to show the correct day of the month and day of the week over a large portion of time. I describe and show it as adapted to show correct readings for any date from 1901 to 1999; but it will be obvious that this range may be extended, if desired.

In ordinary use the calendar is altered or set on the first day of each month, and it then shows the reading for all that month at a glance, and in addition it shows some other years in the century in which the same readings would be accurate.

My calendar consists, essentially, of three superimposed plates or disks relatively rotatable on a central pivot. For the sake of clearness in this specification I will term these the "month-plate," the "year-plate," and the "cover-plate," respectively.

Figure 1:
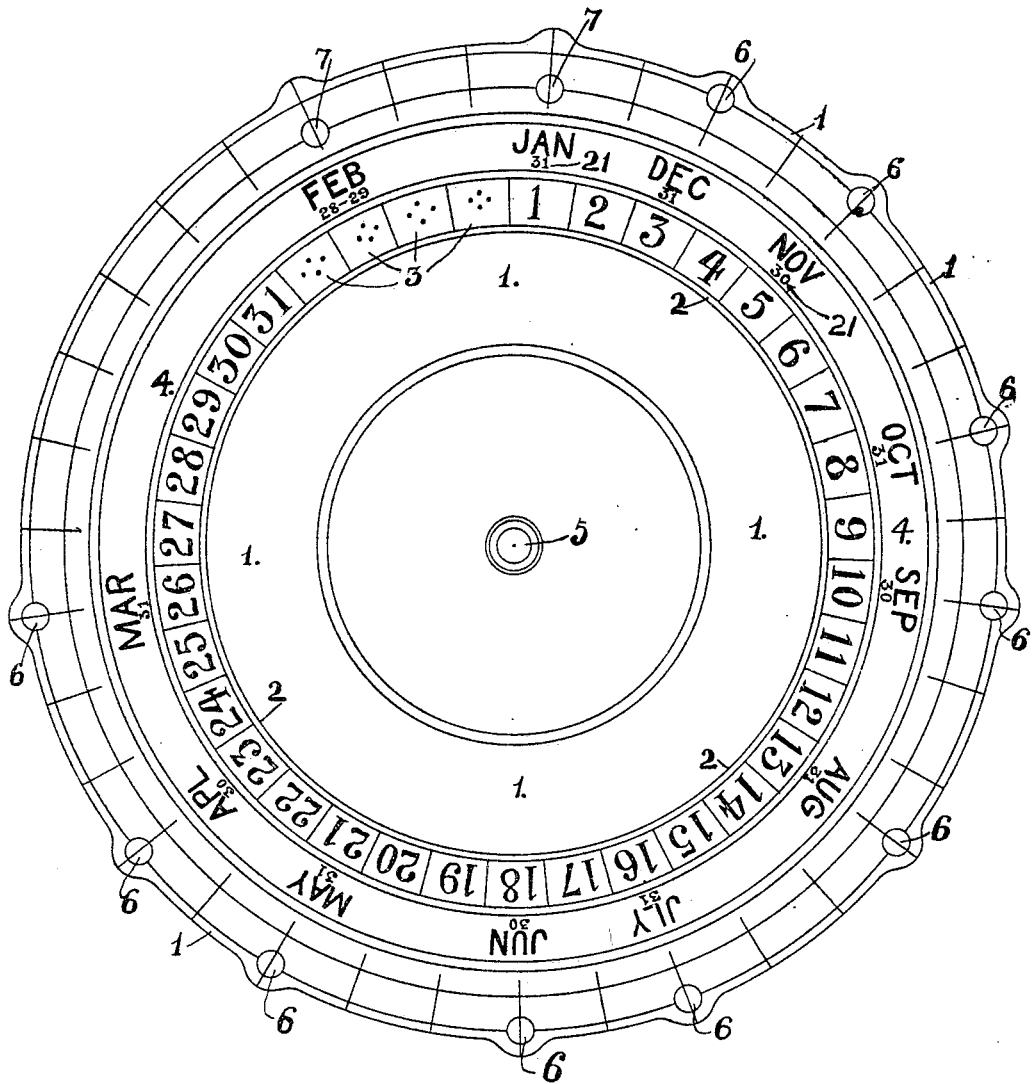
Figure 2:
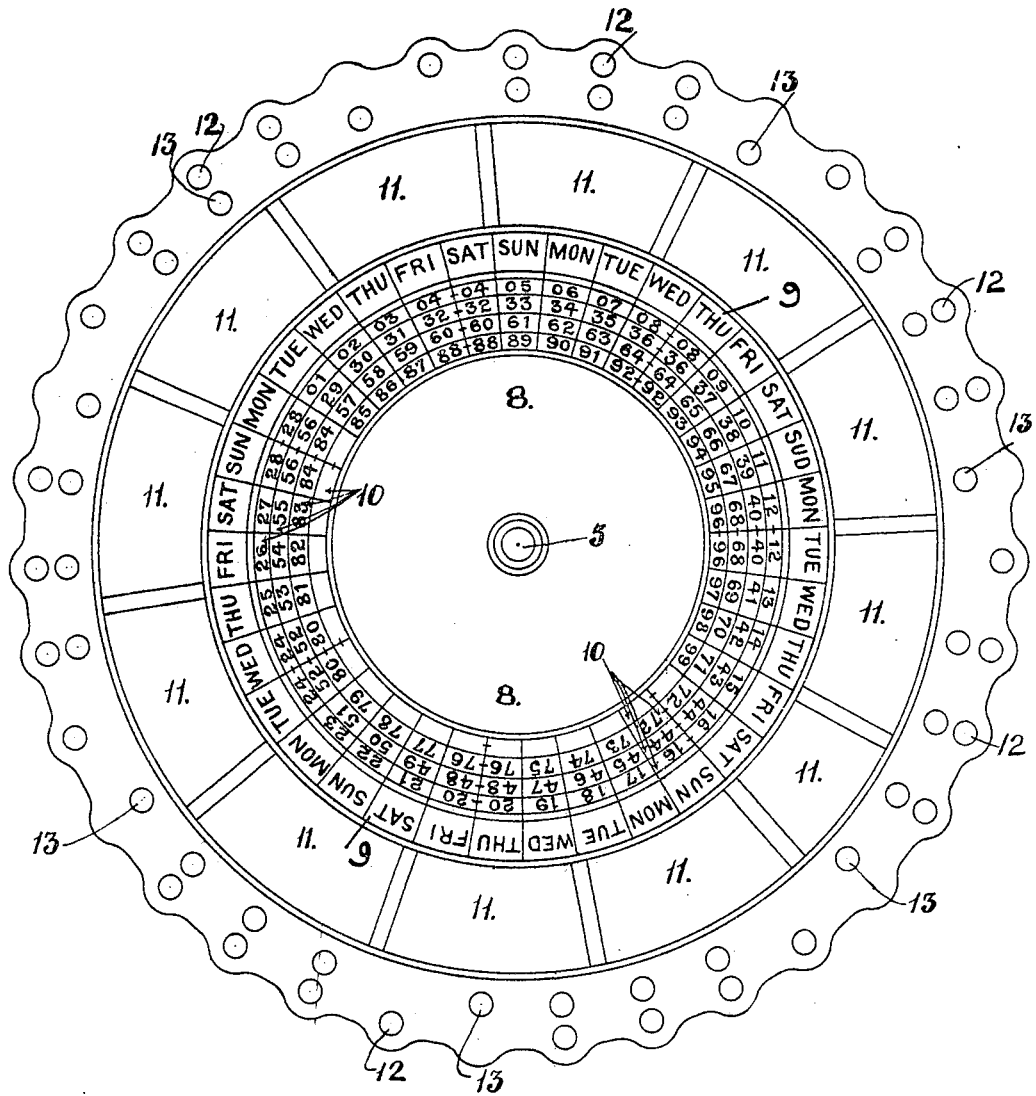
Figure 3:
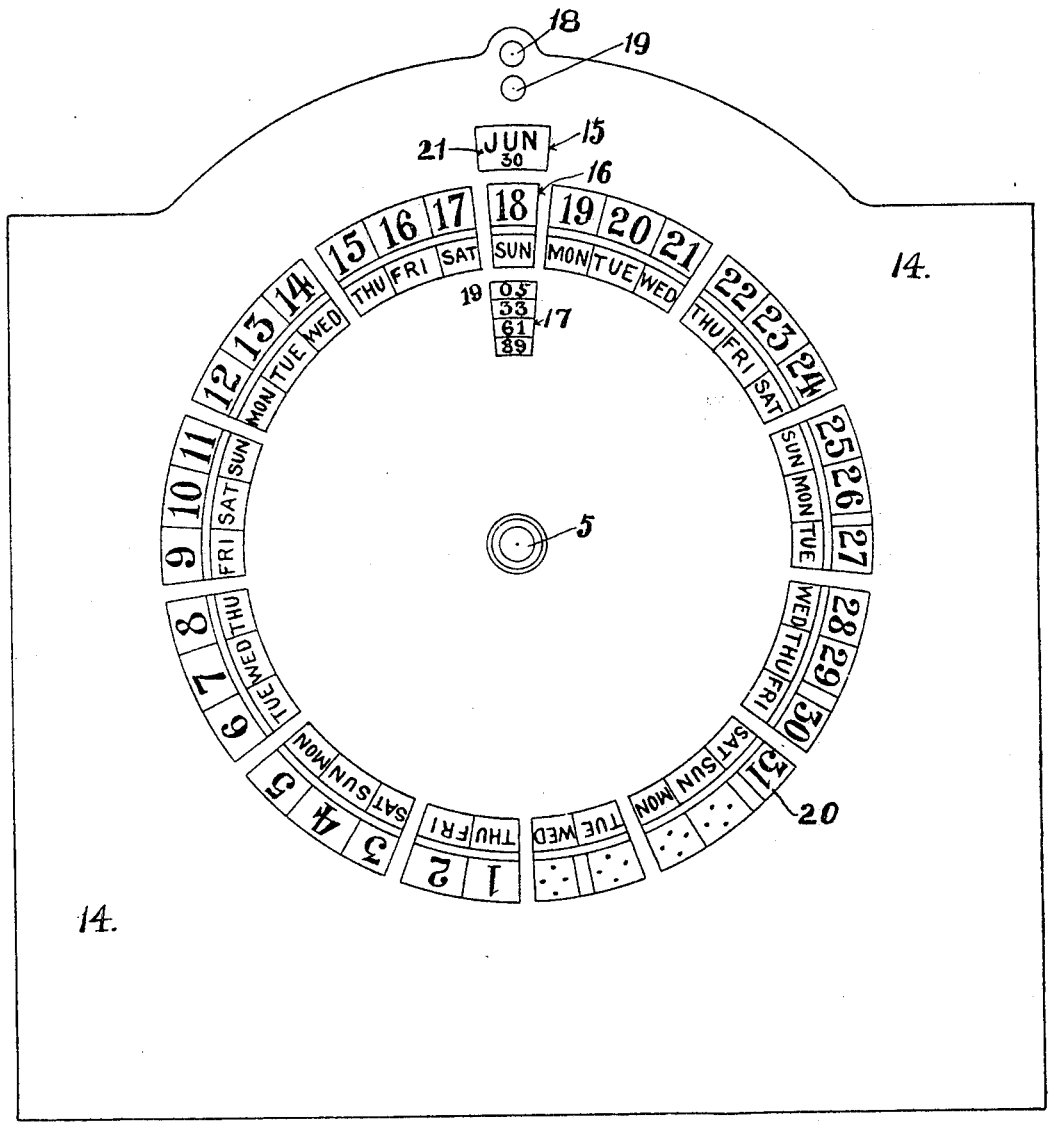
Figure 4:
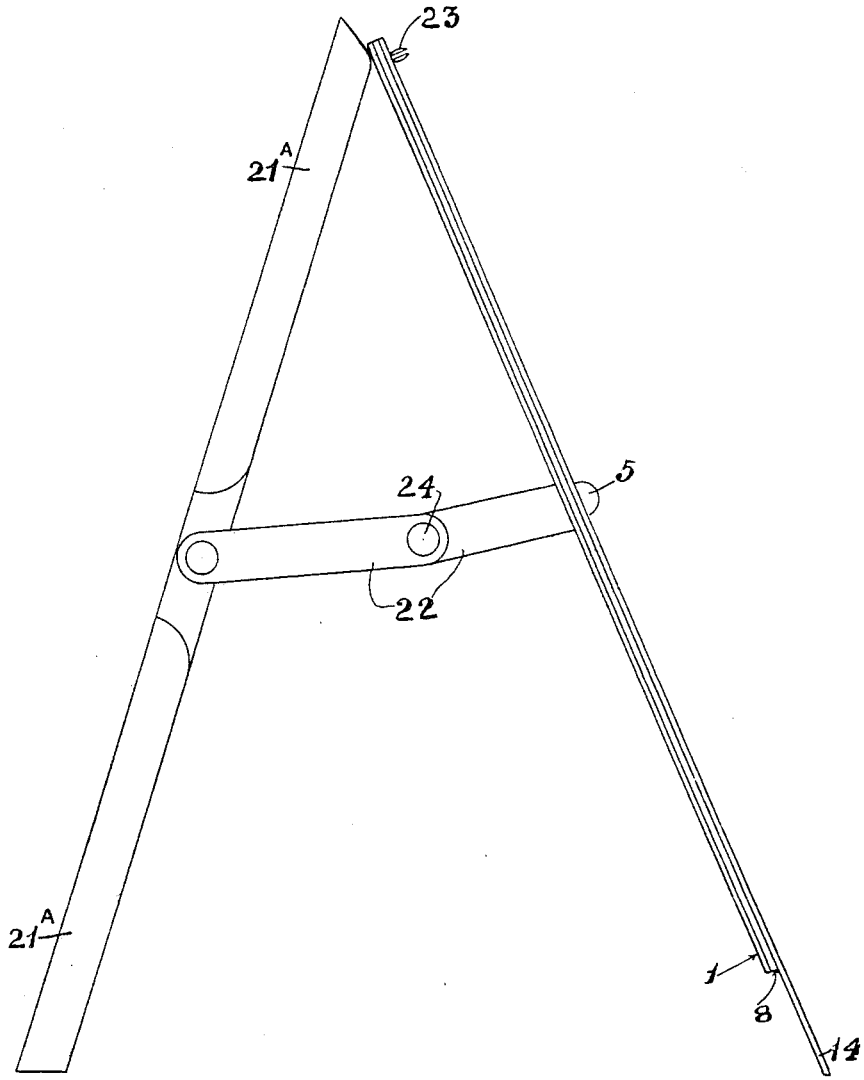
Figure 5:
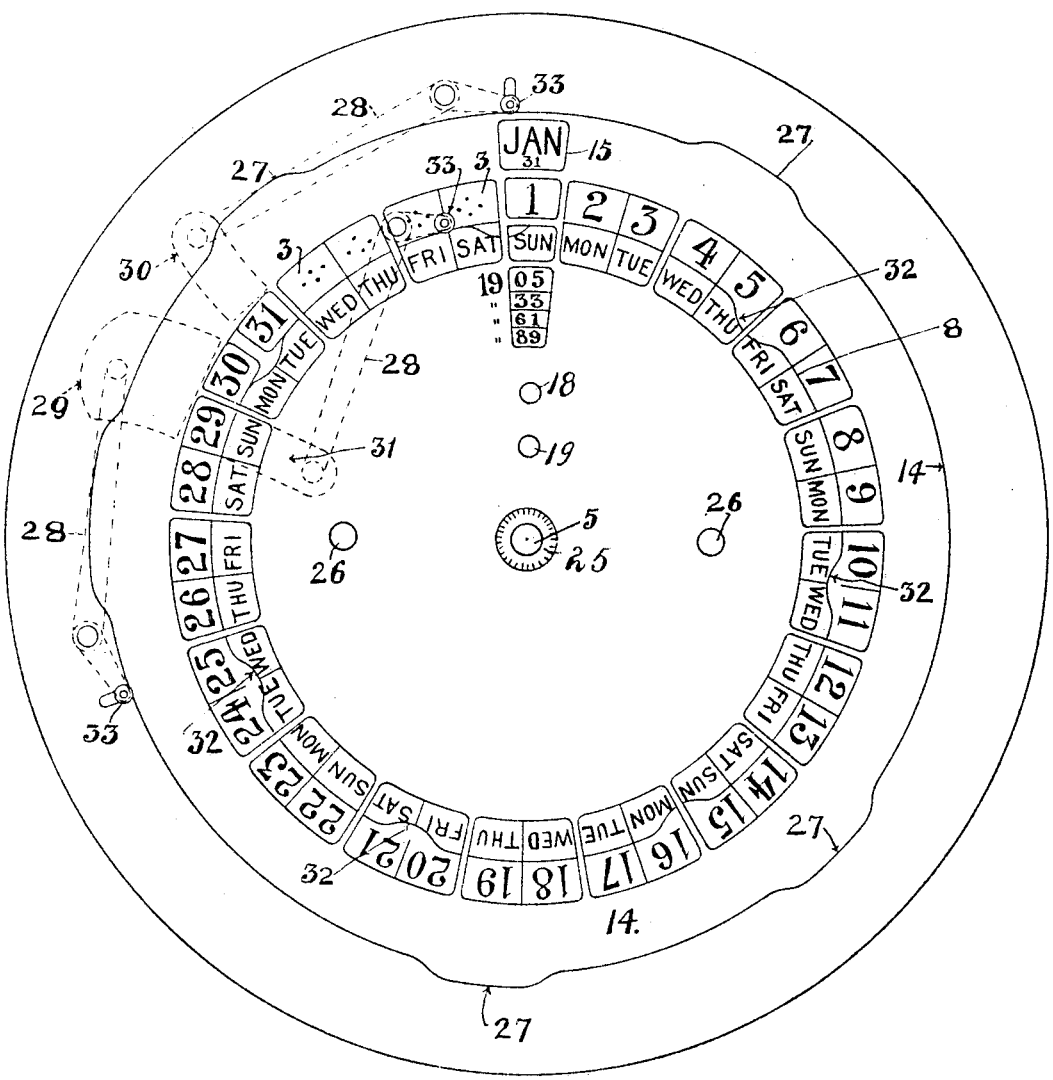
Figure 6:
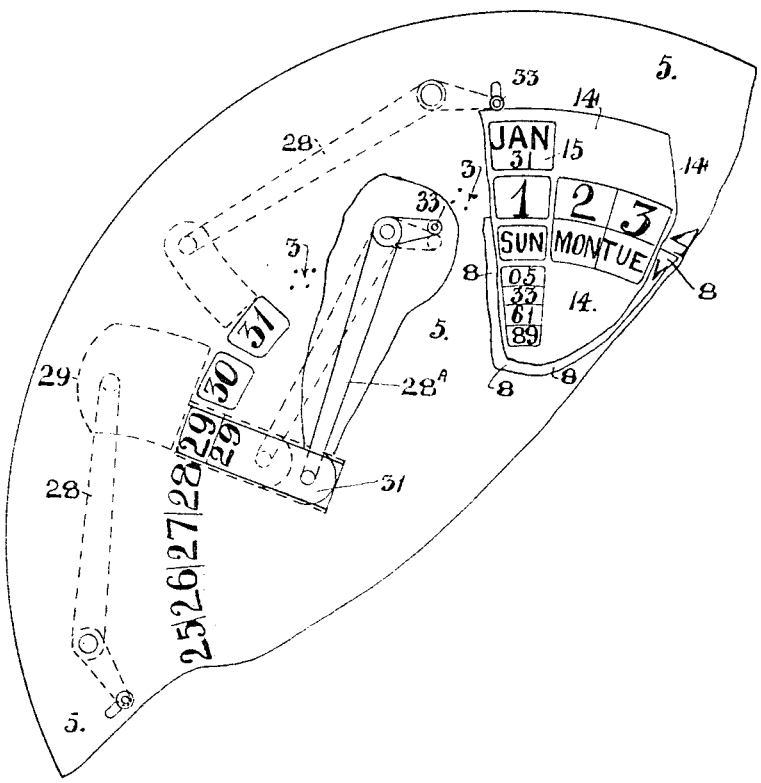

In the drawings, Figure 1 is an elevation of the month-plate, hereinafter described. Fig. 2 is a similar view of the year-plate, hereinafter described. Fig. 3 is an elevation of the cover-plate, hereinafter described, and showing also such portions of the month and year plates as are seen in actual practice through slots in said cover-plate and said year-plate, all as clearly set forth hereinafter. Fig. 4 is a side view of a modification, and Fig. 5 shows an elevation of another modification. Fig. 6 is a fragmentary elevation showing the shutters, hereinafter described, and the levers for actuating them.

Referring first to Figs. 1, 2, and 3, in the form shown in these figures the calendar is adapted to be hung up on a nail in a wall or the like, and a series of perforations are provided for this purpose in the three plates. It is only when the perforations in all three plates coincide that a correct reading is given by the calendar. If a mistake in setting the calendar be made, it will be impossible to hang it up, because there will not be a throughway for the nail. The bottom or month plate 1 (see Fig. 1) is marked with an annulus which is divided radially into thirty-five spaces 2, which have the numerals "1" to "31" placed consecutively around them, and there are four blank spaces 3. Another annulus 4 bears the names of the months, which are pitched as shown—that is, "Jan" in annulus 4 is opposite "1" in annulus 2, "Feb" is opposite the third blank space to the left of "1," and the remaining months are arranged as shown in Fig. 1. 5 is a pivot on which the plates turn relatively. 6 shows a series of holes arranged near the periphery of the disk 1, one opposite the name of each month, with the exception of "Jan" and "Feb," and 7 7 are holes opposite "Jan" and "Feb" at a slightly less distance from the pivot 5.

Referring now to Fig. 2, 8 is the year-plate. This also is divided radially into thirty-five plots and circumferentially into an annulus 9, which bears the days of the week repeated five times, as shown, and four other annuli 10, which carry figures representing the years. There is a difference of value of twenty-eight between each row of these last-named figures. It should be noted that the rows of figures representing leap-years on the year-plate are duplicated. (See, for instance, "08" "08," Fig. 2.) 11 represents slots in the year-plate 8 to allow the month-plate to be seen beneath. 12, Fig. 2, shows holes, which are adapted to coincide with the holes 6 in the month-plate 1, Fig. 1, and 13 shows another series of holes adapted to coincide with the holes 7 in said month-plate. It will be seen that there is only one hole 12 opposite the second row of leap-year figures and only one hole 13 opposite the first row of leap-year figures, and these holes are so pitched, as shown, that if it be attempted to use the wrong set of leap-year figures the holes do not coincide and the calendar cannot be hung up.

Referring now to Fig. 3, 14 is the cover-plate. It has a slot 15 to show the month on the month-plate 1, other annularly-arranged slots 16 to show the day of the month on said month-plate 1 and the days of the week on the year-plate 8, and another slot 17 to show the year of the century on the year-plate 8. These slots may, if desired, be made as one; but it is clearer to have them divided. 18 19, Fig. 3, show holes in the cover-plate 14, which are adapted to aline with holes 12 and 13 in the year-plate 8 and with the holes 6 and 7 in the month-plate, respectively.

As shown in Figs. 1, 2, and 3, the calendar is set for June, 1905, and it also gives correct readings for 1933, 1961, and 1989. 20, Fig. 3, shows the figure "31," which is not correct, as there are only thirty days in June; but the chance of error is small, as each month has the correct number of its days shown. (See 21, Figs. 1 and 3.)

The mode of action of this form of calendar is as follows: To set the calendar, the month-plate is turned round till the current month shows through the slot 15 and the year-plate is turned till the current year shows through the slot 17, and the calendar is then hung up on either hole 18 or hole 19. Should both these holes be masked by the plates beneath, this is due to the wrong row of the leap-year figures on the year-plate having been brought opposite the slot 17, and it then suffices to turn the year-plate one division and a correct reading will then be given and the holes will coincide. The calendar may then be hung up. It will thus be seen that this calendar besides being used for any current month of a century may be used to determine on what day of the week any date in the century falls and that without any "key-numbers" or calculation being necessary. To find out on what day of the week any date in any month of the century falls, it suffices to turn the month-plate 1 around till the required month shows through slot 15 in cover-plate 14 and then to turn the year-plate till the required year shows through slot 17. If the year required happens to be a leap-year, one of the duplicate rows of figures on the years-plate will be brought opposite slot 17, and if it happens not to be a leap-year the other duplicate row of figures on the year-plate will be brought opposite slot 17. Which of the duplicate rows is the correct one will be determined by the holes 6 7 12 13 18 19, because there will not be a throughway in the three disks for the hanging-up nail unless the proper row of the two is selected. This is an important feature of my invention. The relative pitch of the holes in the plates is so calculated that an incorrect alinement is impossible.

The various disks may be made of cardboard, sheet metal, or any other suitable material, and in order to make my invention a success commercially I embellish the free space around the calendar with advertisements. When the calendar is made of cardboard, the holes 6 7 12 13 18 19 are preferably strengthened by eyelets, applied in well-known manner.

Referring now to Fig. 4, in this figure I show a modification of my invention in which the month-plate 1, year-plate 8, and cover-plate 14 (all of which are identical with those above described) are, instead of being hung up on a nail in a wall, permanently attached to an easel-stand 21$^A$ by means of a linked stay 22, so that the calendar may stand by itself on a desk or table. A split pin 23 acts in the same way as the nail in the wall above mentioned and is normally clicked into the holes in the plates 1, 8, and 14 in obvious manner. 24, Fig. 4, is a hinge in stay 22 to allow the disks to rise and fall a little with relation to split pin 23, so that either of the rows of holes 6 7, or 12 13, or 18 19 may be meshed with it.

Referring now to Fig. 5, this modification of my invention is exactly the same as regards the letters, characters, and figures displayed as has been already described. It is, however, intended to be made of more substantial materials and to be fastened up in place—for instance, on board ship or in a public library. In this example the month-plate 1 is a fixture, and the year-plate 8 is revoluble upon it by means of a milled head 25, while the cover-plate 14 is revoluble by means of pins 26, standing out from its surface. On the edge of the cover-plate 14 I provide a series of cams 27, as shown, and these as they come round actuate elbow-levers 28, and thus bring (at the proper period of revolution) shutters 29 30 over the figures "29," "30," and "31" on the month-plate. These shutters when brought into action by the cams 27 cover over the requisite figures. For instance, when "April," "June," "September," or "November" are visible through the slot 15 one of the cams 27 is opposite the tail end of the elbow-lever which actuates shutter 30, and the "31" is thus covered, thus only allowing from "1" to "30" to be visible. When, however, "Feb" is visible through slot 15 in the cover-plate, one of the cams 27 actuates shutter 29 also, thus only allowing from "1" to "28" to be visible, which is correct except during leap-years. I provide also an additional shutter 31, which rides over one-half of shutter 29, and this carries the figure "29." This shutter 31 only comes into use when a leap-year is being demonstrated on the calendar, and it is worked from hollow cam-grooves 32 in the edge of the year-plate 8 by lever 28$^A$. These shutters 29, 30, and 31 are normally retracted by springs (not shown) in obvious manner. Suitable distance-pieces and a segmental casing for the shutters 29, 30, and 31 are provided back of the month-plate 1, and the ends of the elbow-levers are provided with cam-bowls or antifriction-rollers 33 to render the cam action more easy. It will thus be seen that the form of my invention shown in Fig. 5 has the advantage over the others in that the correct number of days for any month in the century is always shown. The holes above described with reference to Figs. 1, 2, and 3—that is, 6, 7, 12, 13, 18, and 19—are preferably placed nearer the center in this modification, their operation and function being the same as in the former construction. Pins, split or tapered, are employed to lock the three plates together, and in this case, as in the former, they will not pass through the plates unless a correct date is shown.

What I claim as my invention, and desire to secure by Letters Patent in the United States, is—

1. A calendar adapted to show the years, months, and days, throughout a century, comprising three relatively rotatable plates, an easel to which said plates are pivoted, a series of holes in said plates, and a pin near the top of said easel adapted to engage said holes.

2. In a calendar adapted to show the years, months, and days throughout a century, the combination of three relatively rotatable plates, that is, a year-plate, a month-plate, and a cover-plate, of shutters which are adapted to cover up the figures "31," and "29," and "30," said shutters being actuated by cams on the edges of the plates.

3. In a calendar, the combination, with relatively movable superposed year, month and day plates each containing appropriate markings, the two upper plates being slotted to afford a view of such portions of the underlying plates as correspond to a correct reading for a given period of time, of shutters arranged to slide beneath the slots to hide the numbers 29, 30 and 31, and cams carried by the plates in proper relation to the years and months to operate the shutters to hide such numbers as are not appropriate to any month and year.

4. A calendar, comprising a plurality of superposed relatively movable plates having arranged thereon in definite relation to each other characters indicatory of a series of years, months and days whereby by an adjustment of the plates the calendar for any particular month of any year of said series of years may be displayed, the characters for the leap-years being duplicated, the outermost of said plates being provided with two holes, the year-plate being provided with two series of holes in definite relation to each other and arranged to respectively register with the two holes in the outermost plates, one hole in each series being arranged in a position corresponding to the common years and one hole in one series being arranged in a position corresponding to one of each set of leap-year characters and a hole in the other series arranged in a position corresponding to the other of each set of leap-year characters, and the month-plate being provided with holes corresponding in position to the months of January and February arranged to register with one of the holes in the outermost plate and with one of the sets of leap-year holes of the year-plate and also being provided with holes corresponding in position to the remainder of the months arranged to register with the other of said holes in the outermost plate and with the other set of leap-year holes in the year-plate.

5. A calendar, comprising a plurality of superposed relatively movable plates having arranged thereon in definite relation to each other characters indicatory of a series of years, months and days whereby by an adjustment of the plates the calendar for any particular month of any year of said series of years may be displayed, the characters for the leap-years being duplicated, the outermost of said plates being provided with two holes, the year-plate being provided with two series of holes in definite relation to each other and arranged to respectively register with the two holes in the outermost plates, one hole in each series being arranged in a position corresponding to the common years and one hole in one series being arranged in a position corresponding to one of each set of leap-year characters and a hole in the other series arranged in a position corresponding to the other of each set of leap-year characters, and the month-plate being provided with holes corresponding in position to the months of January and February arranged to register with one of the holes in the outermost plate and with one of the sets of leap-year holes of the year-plate and also being provided with holes corresponding in position to the remainder of the months arranged to register with the other of said holes in the outermost plate and with the other set of leap-year holes in the year-plate, a support for the plate, and a projection from the support arranged to engage the holes when in register.

6. A calendar, comprising a plurality of superposed relatively movable plates having arranged thereon in definite relation to each other characters indicatory of a series of years, months and days whereby by an adjustment of the plates the calendar in any particular month of any year of said series of years may be displayed, the characters for the leap-years being duplicated, one of the leap-year characters being used for the months of January and February and the other leap-year character for the remaining months of the leap-year, the outermost of said plates being provided with two holes, the year-plate being provided with two series of holes in definite relation to each other and arranged to respectively register with the two holes in the outermost plate, one hole in each series being arranged in a position corresponding to the common years and one hole in one series being arranged in a position corresponding to each of the leap-year characters used for January and February and a hole in the other series being arranged in a position corresponding to each of the leap-year characters used for the remainder of the years, and the month-plate provided with holes corresponding in position to the months of January and February arranged to register with one of the holes in the outermost plate and with the leap-year January and February holes of the year-plate and also being provided with holes corresponding in position to the remainder of the months arranged to register with the other of said holes in the outermost plate and with the other series of holes in the year-plate.

7. A calendar, comprising a plurality of superposed relatively movable plates divided into thirty-five radial spaces having arranged thereon in definite relation to each other characters indicatory of a series of years, the months of a year, the days of a month, and the days of a week, the outermost plate being slotted whereby by an adjustment of the plates the calendar for any particular month of any year of said series of years may be displayed, the characters for the leap-years being duplicated, one of the leap-year characters being for the months of January and February and the other leap-year character for the remainder of the leap-years, the outermost of said plates being provided with two holes, the year-plate being provided with two series of holes arranged to respectively register with the two holes in the outermost plate, one hole in each series being arranged in juxtaposition to the common years and one hole in one series being arranged in juxtaposition to each of the leap-year characters used for January and February and a hole in the other series being arranged in juxtaposition to each of the leap-year characters used for the remainder of the year, and the month-plate being provided with holes in juxtaposition to the months of January and February arranged to register with one of the holes in the outermost plate and with the leap-year January and February holes of the year-plate and also being provided with holes arranged in juxtaposition to the remainder of the months arranged to register with the other of said holes in the year-plate.

8. In a calendar, the combination, with three relatively rotatable superposed year, month and day plates, the upper plates slotted to afford a view of such portions of the underlying plates as correspond to one complete month and year of a series of years, the indicatory characters for the leap-years being duplicated, one of the leap-year characters being used for the months of January and February and the other leap-year character for the remaining months of the leap-year, the outermost of said plates being provided with two holes, the year-plate being provided with two series of holes in definite relation to each other and arranged to respectively register with the two holes in the outermost plate, one hole in each series being arranged in a position corresponding to the common years and one hole in one series being arranged in a position corresponding to each of the leap-year characters used for January and February and a hole in the other series being arranged in a position corresponding to each of the leap-year characters used for the remainder of the years, and the month-plate provided with holes corresponding in position to the months of January and February arranged to register with one of the holes in the outermost plate and with the leap-year January and February holes of the year-plate and also being provided with holes corresponding in position to the remainder of the months arranged to register with the other of said holes in the outermost plate and with the other series of holes in the year-plate, of shutters severally arranged to hide the numbers 29, 30 and 31, and means carried by the plates to operate said shutters to hide such of said numbers for which corresponding days are not found in the months of the year exhibited by the calendar.

In testimony whereof I have signed my name to this specification in the presence of two subscribing witnesses.

JOHN ROWSE HAGGARTY.

Witnesses:
 CHAS. COVENTRY,
 THOMAS NUGENT.